M. FRIEDMAN.
RESILIENT TIRE.
APPLICATION FILED FEB. 11, 1915.
1,168,187.
Patented Jan. 11, 1916.
2 SHEETS—SHEET 1.
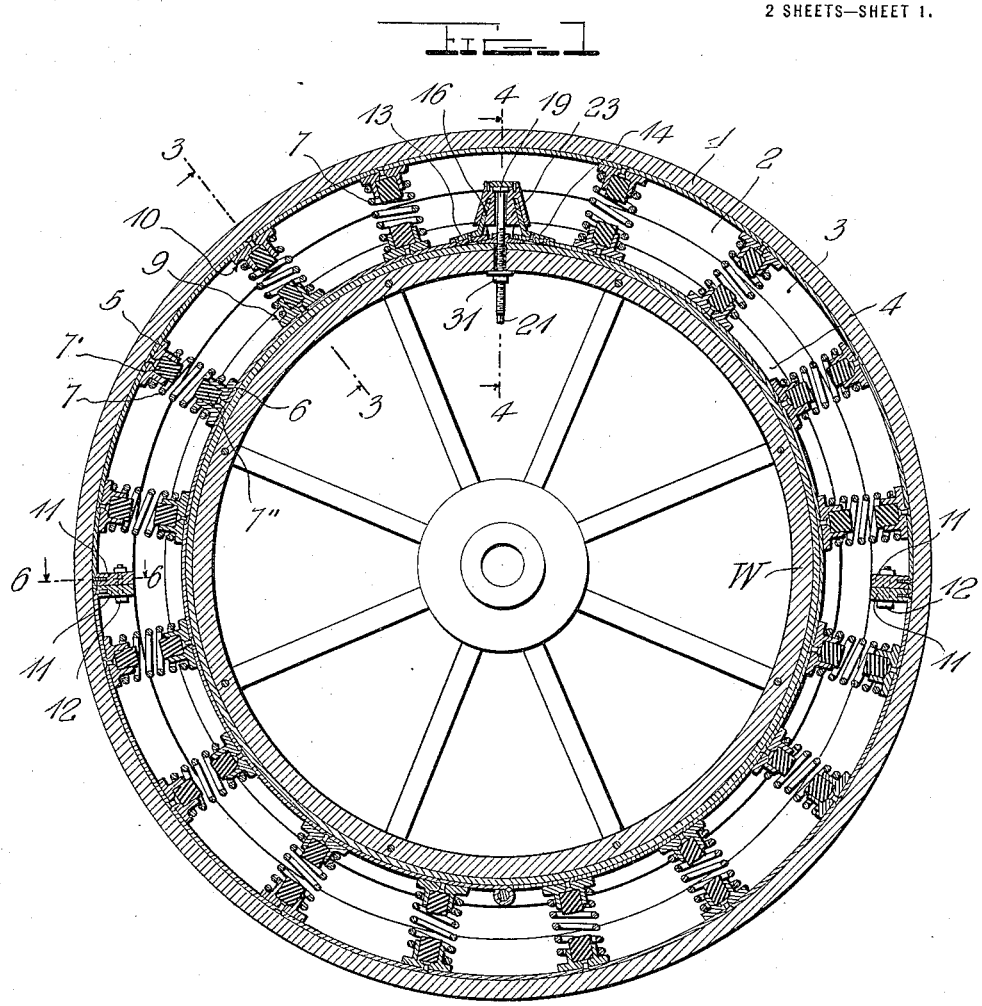
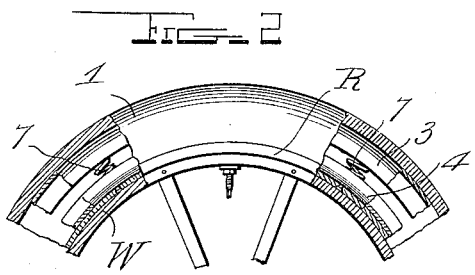
Inventor
Morris Friedman

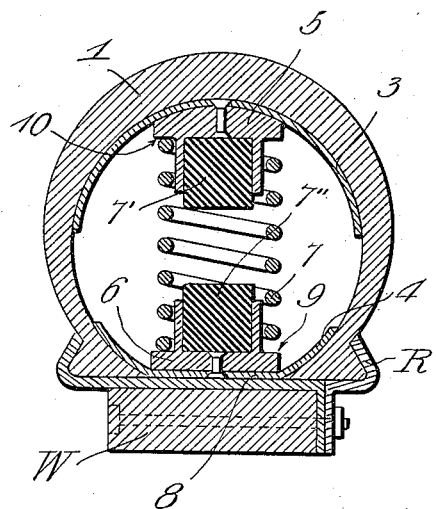
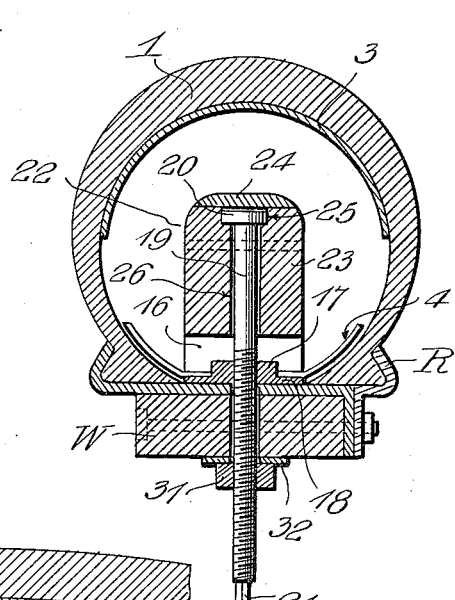
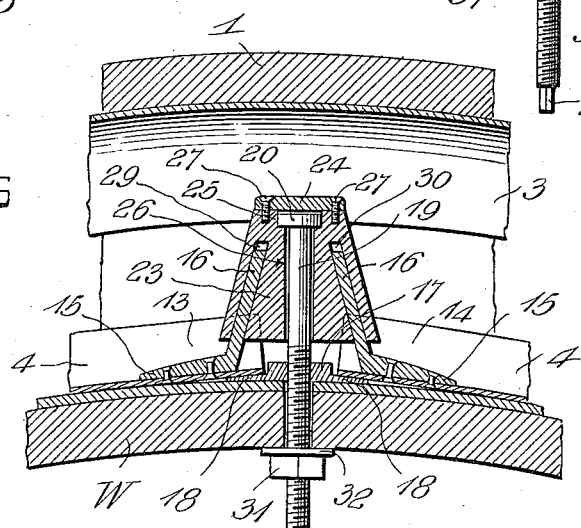
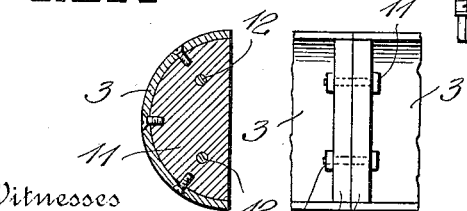

UNITED STATES PATENT OFFICE.

MORRIS FRIEDMAN, OF AVONMORE, PENNSYLVANIA, ASSIGNOR TO ABRAHAM S. BRAVERMAN, OF AVONMORE, PENNSYLVANIA.

RESILIENT TIRE.

1,168,187.  Specification of Letters Patent.  Patented Jan. 11, 1916.

Application filed February 11, 1915. Serial No. 7,538.

*To all whom it may concern:*

Be it known that I, MORRIS FRIEDMAN, a citizen of the United States, residing at Avonmore, in the county of Westmoreland and State of Pennsylvania, have invented certain new and useful Improvements in Resilient Tires; and I do declare the following to be a full, clear, and exact description of the invention, such as will enable others skilled in the art to which it appertains to make and use the same.

This invention relates to improvements in vehicle tires and more especially to cushion tires.

The object of the invention is to provide a resilient wheel tire which has all the advantages of the pneumatic tire and none of its disadvantages.

Another object is to provide a tire of this character equipped with improved means for connecting it to the rim of a wheel.

With the above and other objects in view, the invention consists of certain novel features of construction, combination and arrangement of parts as will be more fully described and claimed.

In the accompanying drawings:—Figure 1 represents a vertical section of a wheel equipped with this improved tire; Fig. 2 is a detail side elevation partly in section; Fig. 3 is a transverse vertical section taken on the line 3—3 of Fig. 1; Fig. 4 is a similar view taken on the line 4—4 of Fig. 1; Fig. 5 is a detail central vertical longitudinal section on an enlarged scale showing the tightening device; Fig. 6 is a detail horizontal section on the line 6—6 of Fig. 1; Fig. 7 is a face view thereof.

In the embodiment illustrated, this improved tire is shown applied to a wheel W of ordinary construction having the usual demountable rim R secured thereto in the usual manner.

This tire comprises the usual outer shoe 1 in which the cushioning member or inner tire 2 is mounted and which comprises an outer annular metal tread member 3 which is substantially semi-circular or U-shape in cross section and an inner annular rim engaging member 4 also substantially U-shape in cross section. These members 3 and 4 are designed to fit within the shoe 1 on the tread and rim portions respectively and the edges thereof are spaced apart a sufficient distance to provide for the yielding of the tire under pressure without said edges coming in contact.

The member 3 which is made of any suitable metal, preferably aluminum, is provided around its periphery with a plurality of inwardly extending longitudinally spaced spring holding tubular members 5 which are shown riveted to the member 3. The member 4 is provided with similarly disposed spring holders 6 constructed in the same manner and of the same size as the tubes 5 of the outer member 3 and which are designed to be positioned opposite the holders 5 on the outer rim member 3 and to form in connection with said holders, guide or retaining members for coiled springs 7 which may be made of any desired or suitable strength to withstand the weight of the vehicle to which the tire is adapted to be applied. These coiled springs are arranged radially around the tire and constitute the cushioning elements being held in position within the tire by the holders above referred to. The central portion or base of the member 4 is flattened as shown at 8 in Fig. 4 to adapt said member 4 to fit the rim portion of the shoe 1 and around the bases of these holders 6 is formed a flattened seat 9 for the inner end of the coiled spring 7 to adapt it to bear uniformly at all points on the member 4. The member 3 is similarly provided with a seat 10 at the base of each of the holders 5 to receive the outer ends of the coiled springs. Cushions 7' and 7'' preferably constructed of rubber are seated in the tubular holders 5 and 6 and are designed to contact and cushion the tire should excessive pressure be exerted thereon.

To provide for the assembling of the inner tire, the outer member 3 is formed in sections, any desired number of which may be employed which are detachably connected at their ends, said sections being here shown provided with semi-circular apertured castings 11 through which fastening bolts 12 are designed to pass for holding the sections in assembled position. The inner member 4 is also composed of sections which are here shown hinged together at one end and provided at their opposite ends with adjusting means for tightening or loosening this inner member to adapt it to be readily applied to and removed from the rim R. As here shown, this tightening means comprises substantially L-shaped brackets 13 and 14 which are shown with their short arms 15 riveted or otherwise secured to the inner face of the free ends of the sections of the member 4 and with their long arms 16 extending radially into the tire, said arms 16 converging toward their free ends as is shown clearly in Fig. 5.

A nut 17 is arranged between the free ends of the sections of the inner member 4 and is provided around the outer edge of its lower face with a laterally extending flange 18 which laps under the ends of the inner member sections and is designed to assist in holding the nut against turning and to form guides for the section ends. A bolt 19 has threaded engagement with the nut 17 and is provided on its inner end with a circular head 20 for a purpose to be described. The other end of this bolt which projects toward the hub of the wheel has a wrench receiving head 21 to provide for the turning of the bolt in the nut 17 for a purpose to be described.

Mounted on the bolt 19 outside the inner member 4 is a block 22 here shown composed of two sections 23 and 24, the meeting face of one of which has a circular recess 25 to form when said sections are connected, a seat for the reception of the bolt head 20 to provide for the swivel connection of the bolt 19. As shown, this block tapers toward its outer end and has a bore 26 extending inwardly for the passage therethrough of the bolt 19 and which communicates with said seat. The block sections are here shown connected by screws 27 as is shown clearly in Fig. 5, and said sections are thereby securely held in assembled position with the bolt 19 passing through the bore 26 therein and projecting some distance beyond the inner larger end of said block, said bolt being threaded on the part which projects beyond the block and said threaded portion is designed to engage the nut 17 for turning the bolt for a purpose to be described.

The block section 23 is provided with radially extending slots 29 and 30 which converge toward the smaller end of the block 22 and in which are designed to be mounted the long arm 16 of the brackets 13 and 14 so that when said block 22 which is disposed within the tire moves toward and away from the inner member 4, the sections of said member will be expanded or contracted according to the direction of movement of the block which is accomplished by turning the bolt 19 by means of a wrench applied to the head 21 thereof. When the block moves outward away from the member 4, the pressure thereof on the arm 16 is relieved and the sections of said member are permitted to expand for applying the tire to the wheel and when the block is moved toward the member 4, the sections are drawn toward each other into clamping engagement with the wheel rim.

In assembling this improved tire, the inner tire is first disposed within the outer shoe, and said shoe then mounted on the rim R and after being placed in position, the bolt 19 is turned to draw the block 22 inward and thereby force the free ends of the sections of the members 4 toward each other and thus cause said member 4 to tightly engage the rim R. After the parts have been positioned to securely lock the tire on the wheel rim, a jam nut 31 is screwed in on the bolt 19 and locks the parts in operative position, a washer 32 being here shown disposed between the jam nut and the nut 17. To remove the tire, it is obvious that all that is necessary is to loosen the member 4 by turning the bolt 19 in the proper direction to cause the block 22 to move away from said member 4 when the shoe 1 containing the inner tire may be readily removed.

The block 22 is so proportioned relative to the tire that ample space is provided between its smaller outer end and the tread portion of the tire and should the tread portion be so compressed as to bring the block adjacent the inner face of the tread, the rubber cushions would contact and prevent bumping.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim as my invention:—

1. The combination with a transversely split tire member, of a device for connecting the ends thereof comprising arms extending outwardly from the ends of said tire member and converging toward their free ends, a block having a bolt swiveled therein, a nut disposed between the ends of said tire member and through which said bolt extends, said nut having lateral flanges lapping under said tire member ends, said block having slots to receive said arms and converging toward their outer ends.

2. The combination with a transversely split tire member, of a device for connecting the ends thereof comprising arms extending outwardly from the ends of said tire member and converging toward their free ends, a sectional block having registering recesses to form a seat, a bore communicating with said seat, a bolt mounted in said bore and having a circular head swiveled in said seat, one section having slots to receive said arms, a nut positioned for threaded engagement with said bolt, and means for connecting said sections.

In testimony whereof I have hereunto set my hand in presence of two subscribing witnesses.

MORRIS FRIEDMAN.

Witnesses:
J. A. GRIESBAUER,
GEORGE W. GIOVANNETTI.